June 13, 1950 W. A. MILLER 2,511,216
PROCESS OF MAKING ELECTRICAL RESISTORS
Filed Aug. 1, 1946
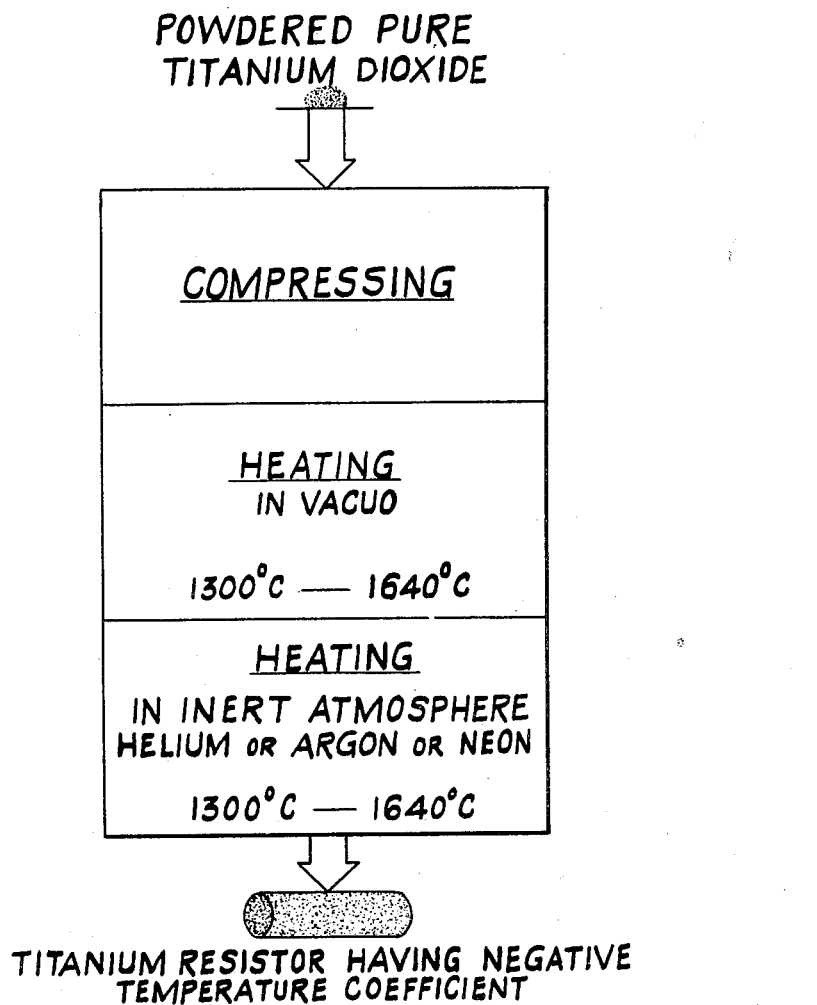
INVENTOR
William A. Miller
BY
Harry Tunick
ATTORNEY Patented June 13, 1950

2,511,216

UNITED STATES PATENT OFFICE 2,511,216

PROCESS OF MAKING ELECTRICAL RESISTORS

William A. Miller, Port Jefferson, N. Y., assignor to Radio Corporation of America, a corporation of Delaware Application August 1, 1946, Serial No. 687,719

5 Claims. (Cl. 25—157)

This invention relates to a process of making new and improved electrical titanium dioxide resistors having a negative temperature coefficient of resistance.

An object of this invention is to provide a new and useful electrical resistance which is very strong and inexpensive to manufacture.

The negative temperature coefficient resistors of this invention are very useful in certain circuits; such as, for example, balancing resistors in vacuum tube circuits, ballast resistors, voltage regulators, and many other applications.

Negative temperature resistors of the prior art were generally constructed of uranium oxide, which resistors were expensive to manufacture, not durable, and had a relatively low negative temperature coefficient.

My invention overcomes the disadvantages of the prior art resistors by providing a device which is superior to uranium oxide thermistors, both from the standpoint of durability, maximum allowable operating temperature, and magnitude of the temperature coefficient of resistance. I have found that pure titanium dioxide, when compressed and fired at high temperatures in the order of about 1200° to 1500° C. in an oxidizing atmosphere (such as, for example, air, oxygen), shrinks and becomes very hard. The color of the fired (if fired in oxidizing atmosphere) titanium dioxide is quite similar to the unfired powder. This form is an excellent insulator having a high dielectric constant. Therefore, I have found that if pure titanium dioxide is compressed in a pellet and fired in a vacuum furnace at from 1300° C. to nearly the melting point (about 1640° C., at which temperature the oxide tends to decompose), the color of the fired ceramic varies from a light chalky blue to an intense blue-black, depending on the temperature and time of firing. This color is due to the precipitation of titanium metal out of the oxide, the oxygen being removed by the vacuum pumps. It is this finely dispersed metal which accounts for the material becoming conductive and, therefore, may be applied to use as an electrical resistor. Pure titanium dioxide processed as mentioned above has a conductivity which depends on the time and temperature, and the resistance has a negative temperature coefficient.

The resistors of this invention are very strong, hard, and will operate satisfactorily at 400° C. Due to the fact that both the resistivity and strength are functions of the time and temperature, either one of the two following processes will produce desirable and improved resistors.

Method I (a) The pure titanium dioxide powder is first compressed in a suitable die. The compressed pellet is then removed from the die and is fired at high temperatures of 1200° C. to 1500° C. in air, oxygen, or an inert atmosphere such as helium, thus preserving the original oxide while at the same time producing a hard, firm and durable ceramic body.

(b) The ceramic body is then given a subsequent heat treatment in a vacuum at a high temperature (1200° C.–1500° C.) and the heat treatment continued for a time depending upon the desired resistance characteristics.

Method II (a) The pure titanium dioxide powder is compressed in a suitable die. The compressed pellet is then removed from the die and fired in a vacuum long enough and at a high enough temperature to produce a ceramic body of the desired resistance characteristics.

(b) Then, helium, argon, or neon (inert gas) is introduced into the vacuum chamber, and firing of the ceramic body at high temperature is continued long enough to produce the desired hardness. It is to be noted that with both of my methods the process may be considered as being in two steps (and these may be taken in either order), viz., heating at high temperatures of around 1200° C. to 1500° C., then heating at the same high temperatures in the inert atmosphere. The temperature and time of treatment in each of the two methods outlined above determine the resistive properties of the final product.

With either of these methods of manufacture there is no limitation on the physical size or shape of these resistors.

Further, the negative temperature coefficient resistors of this invention, made of titanium-titanium dioxide, are superior to uranium oxide thermistors both from the standpoint of durability, maximum allowable operating temperature, and magnitude of the temperature coefficient of resistance.

What is claimed is:

1. The method of producing an electrical resistance comprising the steps of compressing a quantity of pure titanium dioxide in a pellet, firing said pellet in a vacuum furnace at 1300° C. and then firing said pellet in an atmosphere containing an inert gas of the group consisting of helium, neon and argon.

2. The process of making an electrical resistance element comprising the steps of shaping an element of pure titanium dioxide by a compression method, heating said compressed element in a vacuum furnace at a temperature from 1300° C. to approximately 1640° C., placing the resistance element in an inert atmosphere of a gas of the group consisting of helium, neon and argon, and continuing the heating until the desired resistance value is obtained.

3. The process of making an electrical resistance element comprising the steps of shaping an element of pure titanium dioxide by a compression method, heating said compressed element in a vacuum furnace at a temperature from 1300° C. to approximately 1640° C., placing the resistance element in an inert atmosphere of helium, and continuing the heating of said element until the desired resistance characteristic is obtained.

4. The process of making an electrical resistance element comprising the steps of shaping an element of pure titanium dioxide by a compression method, heating said compressed element in a vacuum furnace at a temperature from 1300° C. to approximately 1640° C., then placing the resistance element in an inert atmosphere of argon, and continuing the heating in said furnace until the desired resistance characteristic is obtained.

5. The process of making an electrical resistance element comprising the steps of shaping an element of pure titanium dioxide by a compression method, heating said compressed element in a vacuum furnace at a temperature from 1300° C. to approximately 1640° C., then placing the resistance element in an inert atmosphere of neon, and continuing the heating in said furnace until the desired resistance characteristic is obtained.

WILLIAM A. MILLER.

REFERENCES CITED

The following references are of record in the file of this patent:

UNITED STATES PATENTS

| Number | Name | Date |
|---|---|---|
| 648,518 | Ochs | May 1, 1900 |
| 1,774,607 | Lubowsky | Sept. 2, 1930 |
| 1,947,692 | Beyer | Feb. 20, 1934 |
| 2,140,228 | Henke | Dec. 13, 1938 |
| 2,289,211 | Ridgway | July 7, 1942 |
| 2,330,950 | Bugel | Oct. 5, 1943 |
| 2,371,660 | Wainer | Mar. 20, 1945 |